(12) United States Patent
Barnhouse et al.

(10) Patent No.: US 11,939,514 B2
(45) Date of Patent: Mar. 26, 2024

(54) SELF-HEALING WATER-SWELLABLE HYDRAULIC SEAL

(71) Applicant: Danfoss A/S, Nordborg (DK)

(72) Inventors: James Patrick Barnhouse, Perrysburg, OH (US); Aaron David Clark, Lambertville, MI (US); Kelly Ann Williams, South Lyon, MI (US)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 17/546,756

(22) Filed: Dec. 9, 2021

(65) Prior Publication Data

US 2022/0098459 A1 Mar. 31, 2022

Related U.S. Application Data

(62) Division of application No. 16/063,184, filed as application No. PCT/US2016/066965 on Dec. 15, 2016, now Pat. No. 11,230,652.

(60) Provisional application No. 62/268,301, filed on Dec. 16, 2015.

(51) Int. Cl.
| | |
|---|---|
| *C08L 5/00* | (2006.01) |
| *C08L 9/02* | (2006.01) |
| *C08L 13/00* | (2006.01) |
| *C08L 15/00* | (2006.01) |
| *C08L 97/02* | (2006.01) |
| *C09K 3/10* | (2006.01) |
| *C09K 3/12* | (2006.01) |
| *C08L 5/06* | (2006.01) |

(52) U.S. Cl.
CPC .............. *C09K 3/1028* (2013.01); *C08L 5/00* (2013.01); *C08L 9/02* (2013.01); *C08L 13/00* (2013.01); *C08L 15/00* (2013.01); *C08L 97/02* (2013.01); *C09K 3/10* (2013.01); *C09K 3/12* (2013.01); *C08L 5/06* (2013.01); *C08L 2201/08* (2013.01); *C08L 2205/06* (2013.01); *C08L 2205/16* (2013.01); *C09K 2003/104* (2013.01); *C09K 2003/1053* (2013.01); *C09K 2200/0612* (2013.01); *C09K 2200/0692* (2013.01)

(58) Field of Classification Search
None
See application file for complete search history.

(56) References Cited

U.S. PATENT DOCUMENTS

| | | | |
|---|---|---|---|
| 4,546,033 A | 10/1985 | Tsuchimoto et al. | |
| 4,590,227 A | 5/1986 | Nakamura et al. | |
| 4,708,351 A | 11/1987 | Midooka et al. | |

(Continued)

FOREIGN PATENT DOCUMENTS

| | | |
|---|---|---|
| EP | 1 616 906 A1 | 1/2006 |
| WO | 96/25458 A1 | 8/1996 |
| WO | 2013/070082 A1 | 5/2013 |

OTHER PUBLICATIONS

Lachat, V. "Understanding Oil Resistance of Nitrile Rubber". CN Group Interactions at Interfaces. Thesis, University of Akron. 2008. (Year: 2008).*

(Continued)

*Primary Examiner* — Richard A Huhn
(74) *Attorney, Agent, or Firm* — Merchant & Gould P.C.

(57) ABSTRACT

A self-healing hydraulic seal is provided. The self-healing hydraulic seal is prepared from a water-swellable elastomeric composition comprising a base polymer and a plant-based polysaccharide.

16 Claims, 14 Drawing Sheets

(56) References Cited

U.S. PATENT DOCUMENTS

| | | | |
|---|---|---|---|
| 5,738,664 | A | 4/1998 | Erskine et al. |
| 6,358,580 | B1* | 3/2002 | Mang .................. C08L 25/10 |
| | | | 428/36.1 |
| 8,490,707 | B2 | 7/2013 | Robisson et al. |
| 2009/0084550 | A1 | 4/2009 | Korte et al. |
| 2012/0208934 | A1 | 8/2012 | Korte et al. |
| 2013/0269787 | A1 | 10/2013 | Choi et al. |
| 2013/0274397 | A1 | 10/2013 | Choi et al. |
| 2014/0087977 | A1* | 3/2014 | Kim .................. C09K 8/50 |
| | | | 507/224 |
| 2015/0299438 | A1 | 10/2015 | Choi et al. |

OTHER PUBLICATIONS

Penner, M. et al., "Nonstarch Polysaccharicie Fractions of Raw, Processed and Cooked Carrots". Journal of Food Science 1991, 56 (6), 1593-1596, 1599. (Year: 1991).*

International Search Report and Written Opinion of the International Searching Authority forApplication No. PCT/US2016/066965 dated Apr. 4, 2017, 10 pages.

Supplementary European Search Report for EP 16876696.2 dated May 29, 2019, 7 pages total.

Communication under Rule 71(3) EPC dated Dec. 9, 2020 in corresponding European application No. 16876696.2, 50 pages total.

Erifon 818 Series, Motion Compensator & Tensioner Fluids, MacDermid Offshore Solutions, 2 pages (2011).

Material Safety Data Sheet, HOUGHTO-SAFE 273, Houghton International Inc, 6 pages (2005).

Seyger, R. et al., "The Future of Swelling Elastomers: An Elastomer Manufacturer's View of Swelling Elastomer Developments and Market Trends", TJER, 10(1): 50-64 (2013).

Vulkacit® DM-PB/C, Product Description Supply Form, Lanxess, 2 pages (2013).

Oil Resistance Energized by Lanxess Energizing Chemistry, 32 pages (2013).

Hydrobind Carrot Fiber data sheet, May 16, 2005, 3 pages total.

Alfa Laval solutions for processing starch, 2004, 20 pages total.

CP Kelco ApS, Genu Pectin Book, 2001, 24 pages total.

Lachat, V., "Understanding Oil Resistance of Nitrile Rubber", CN Group Interactions at Interfaces, Doctor of Philosophy thesis, University of Akron (2008).

Lattimer, J. et al., "Effects of Dietary Fiber and is Components on Metabolic Health", Nutrients, 2: 1266-1289 (2010).

Penner, M. et al., "Nonstarch Polysaccharicie Fractions of Raw, Processed and Cooked Carrots", Journal of Food Science, 56(6): 1593-1596, 1599 (1991).

* cited by examiner

SELF-HEALING WATER-SWELLABLE HYDRAULIC SEAL

CROSS-REFERENCE TO RELATED APPLICATION

This application is a Divisional application claiming priority to U.S. application Ser. No. 16/063,184, filed Jun. 15, 2018, now U.S. Pat. No. 11,230,652 issued Jan. 25, 2022, which is a National Stage Application of PCT/US2016/066965, filed on Dec. 15, 2016, which claims the benefit of U.S. Patent Application Ser. No. 62/268,301, filed on Dec. 16, 2015, the disclosures of each of which are incorporated herein by reference in their entireties. To the extent appropriate, a claim of priority is made to each of the above disclosed applications.

BACKGROUND

One of the primary failure modes for today's hydraulic cylinders is excessive seal leakage. This effect can be caused by factors such as debris, irregular rod surface, excessive exposure to heat, excessive pressure, improper installation, wear, etc. Today when seal leakage is detected the cylinder must be removed and repaired resulting in costly downtime (up to $1 M/day for an oil & gas exploration rig). It would be desirable to extend the life of the sealing system in order to allow the operator to reach a scheduled maintenance period prior to seal replacement, thereby reducing the cost of downtime.

SUMMARY OF THE INVENTION

A water-swellable elastomeric composition, methods of preparing the composition, and articles prepared from the composition are provided. The water-swellable elastomeric composition comprises a base polymer and a plant-based polysaccharide.

In one embodiment, a self-healing hydraulic backing seal is provided as prepared from a water-swellable composition comprising a acrylonitrile butadiene rubber (NBR) and a plant-based polysaccharide. The self-healing backing seal is designed to flow and fill a cut or damaged primary seal. In some embodiments, the composition further comprises a diffusion promoter and a fluid retaining agent according to the disclosure. In some embodiments, the composition further comprises one or more of a reinforcing filler, plasticizer, curing agent, activator, acid scavenger, colorant, and/or biocide according to the disclosure.

In one embodiment, a self-healing hydraulic seal is provided prepared from a water-swellable elastomeric composition comprising a base polymer and a plant-based polysaccharide.

In some embodiments, the self-healing hydraulic seal is prepared from a water-swellable elastomeric composition comprising a base polymer selected from the group consisting of acrylonitrile butadiene rubber (NBR), carboxylated acrylonitrile butadiene rubber, hydrogenated acrylonitrile butadiene rubber, carboxylated hydrogenated acrylonitrile butadiene rubber, chlorosulfonated polyethylene rubber (CSM); and mixtures or blends thereof. In one aspect, the base polymer is NBR. In another aspect, the NBR is 19-51% acrylonitrile butadiene rubber. In a further aspect, the NBR is 20-33% acrylonitrile NBR.

In some embodiments, the self-healing hydraulic seal is prepared from a water-swellable elastomeric composition comprising a plant-based polysaccharide selected from the group consisting of carrot fiber, squash fiber, yam fiber, turnip fiber, parsnip fiber, coir fiber (coconut husk), flax fiber (herbaceous plant), rice paper plant fiber (*Tetrapanax papyriferus*), palm fiber, beet fiber, apple fiber, orange fiber, and grapefruit fiber, and mixtures and blends thereof. In a particular aspect, the plant-based polysaccharide is carrot fiber.

In some embodiments, the self-healing hydraulic seal is prepared from a water-swellable elastomeric composition comprising a diffusion promoter selected from sodium acetate, potassium acetate, sodium formate, potassium formate, sodium triphosphate, potassium triphosphate, sodium polyphosphate, potassium polyphosphate, sodium carbonate, potassium carbonate, or mixtures and combinations thereof.

In some embodiments, the self-healing hydraulic seal is prepared from a water-swellable elastomeric composition comprising a fluid retaining agent. In a particular aspect, the fluid retaining agent is sodium bentonite.

In some embodiments, the self-healing hydraulic seal is prepared from a water-swellable elastomeric composition comprising a reinforcing filler. In particular aspects, the reinforcing filler is a silica reinforcing filler.

In some embodiments, the self-healing hydraulic seal is prepared from a water-swellable elastomeric composition comprising an additive selected from the group consisting of curing agents, activators, plasticizers, retarders, scavengers, accelerators, antioxidants, colorants, antiozonants, processing aids, biocides, flame retardants; or blends or mixtures thereof.

In a particular aspect, the self-healing hydraulic seal is selected from a backing seal, O-ring, packer, or gasket.

In another embodiment, a water-swellable elastomeric composition comprising a base polymer and a plant-based polysaccharide is provided. In one embodiment, the base polymer is selected from the group consisting of acrylonitrile butadiene rubber (NBR), carboxylated acrylonitrile butadiene rubber, hydrogenated acrylonitrile butadiene rubber, carboxylated hydrogenated acrylonitrile butadiene rubber, chlorosulfonated polyethylene rubber (CSM); and mixtures or blends thereof. In another embodiment, the plant-based polysaccharide is selected from the group consisting of carrot fiber, squash fiber, yam fiber, turnip fiber, parsnip fiber, coir fiber (coconut husk), flax fiber (herbaceous plant), rice paper plant fiber (*Tetrapanax papyriferus*), palm fiber, beet fiber, apple fiber, orange fiber, and grapefruit fiber, and mixtures and blends thereof. In a particular aspect, the NBR is an NBR selected in the range of 19-51% acrylonitrile butadiene rubber and the plant-based polysaccharide is carrot fiber.

In another embodiment, a water-swellable elastomeric composition comprising a base polymer and a plant-based polysaccharide is provided, further comprising a diffusion promoter selected from sodium acetate, potassium acetate, sodium formate, potassium formate, sodium triphosphate, potassium triphosphate, sodium polyphosphate, potassium polyphosphate, sodium carbonate, potassium carbonate, or mixtures and combinations thereof. In one aspect, the water-swellable elastomeric composition further comprises a fluid retaining agent. In a specific aspect, the fluid retaining agent is sodium bentonite. In another aspect, the water-swellable elastomeric composition comprises a reinforcing filler.

In a further aspect, the water-swellable elastomeric composition comprises an additive selected from the group consisting of curing agents, activators, plasticizers, retarders, acid scavengers, accelerators, antioxidants, colorants, antiozonants, processing aids, biocides, flame retardants; or blends or mixtures thereof.

In a specific embodiment, a water-swellable elastomeric composition is provided comprising an acrylonitrile butadiene rubber (NBR) at 100 pph, and a plant based polysaccharide at 10-100 pph, 20-80 pph, 30-70 pph, or 40-60 pph. In a specific embodiment, a water-swellable elastomeric composition is provided comprising an 19-51% acrylonitrile butadiene rubber (NBR) at 100 pph, and carrot fiber at 10-100 pph, 20-80 pph, 30-70 pph, or 40-60 pph. In one aspect, the water-swellable elastomeric composition comprises a fluid retaining agent at 5-20 pph, a silica reinforcing filler at 5-50 pph, and a diffusion promoter at 5-20 pph. In another aspect, the water-swellable elastomeric composition comprises a plasticizer at 2.5-25 pph, an activator at 2.5-10 pph, an antioxidant at 0.5-2 pph, and a curing agent at 0.5-3 pph.

In another embodiment, a method for preparing an article from a water-swellable elastomeric composition is provided comprising mixing the composition with a Banbury rubber mixer, milling the rubber, applying to seal dimensional mold, and curing the article.

DETAILED DESCRIPTION OF THE INVENTION

Figure 1:
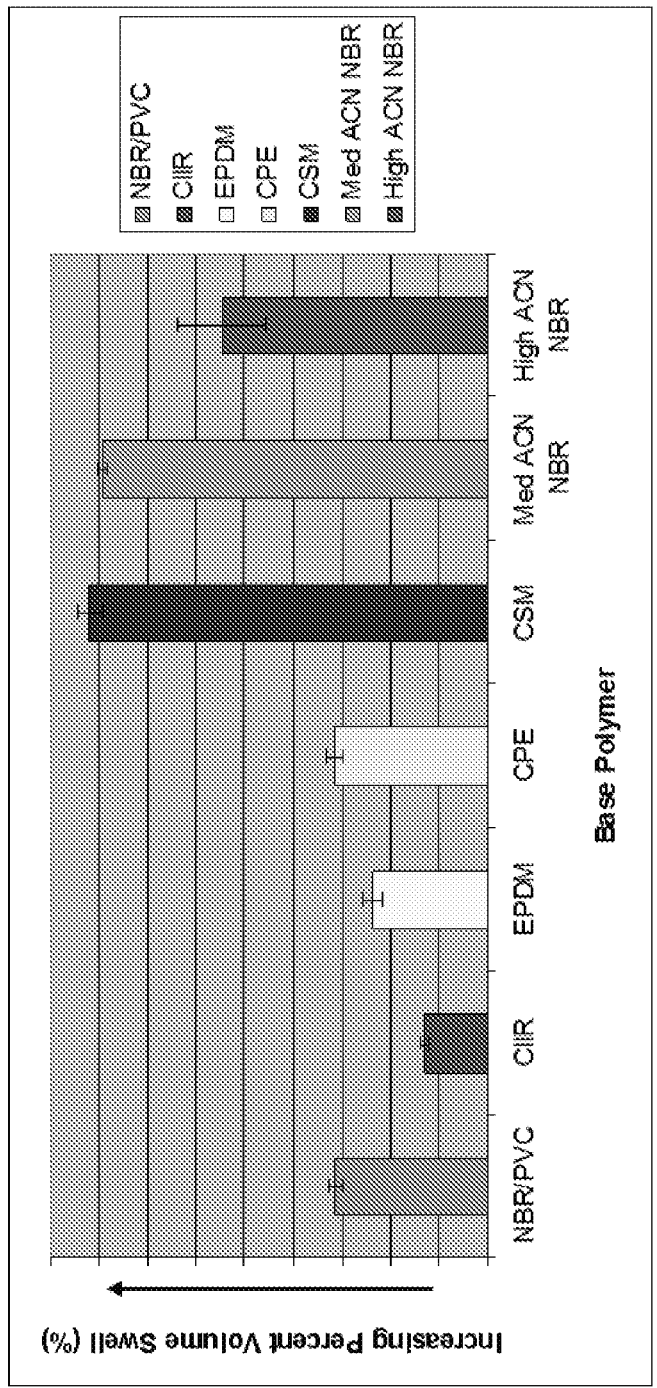
FIG. 1 shows base polymer volume swell without swell inducing filler.

As used herein, the terms "a" or "an" are defined as singular or plural.

As used herein, the term "about" means within ten percent (10%) of the given value, either ten percent more than the given amount or ten percent less than the given amount, or both.

As used herein, the term "composition" refers to one or more of a compound, mixture, blend, alloy, polymer and/or copolymer.

As provided herein, ranges are intended to include, at least, the numbers defining the bounds of the range.

O-ring and hydraulic seal failure modes can occur from abrasion, for example, due to rough sealing surfaces, process environment containing an abrasive particles, dynamic motion, and poor elastomeric surface finish; excessive compression set due to incompletely cured elastomer, or excessive volume swell in chemical; chemical degradation due to incompatibility and/or thermal environment; installation damage due to sharp edges on components, or improper sizing of seal; and thermal degradation due to elastomer thermal properties, or excessive temperature excursions or cycling.

While traditional elastomeric materials tend to swell up to 200% in hydraulic oil, most are resistant to swell in water and water-based fluids. A series of additives have been identified to increase the swelling of elastomeric compositions when exposed to water, salt water, ethylene glycol, or other hydraulic fluids or water-based fluids is provided. The disclosure provides water-swellable elastomeric compositions comprising a base polymer and a plant-based polysaccharide that upon exposure to water or water based fluids such as, but not limited to, ethylene glycol, propylene glycol, water, or salt water, or mixtures thereof, will swell to over 200% of its original size while retaining sufficient physical properties to maintain system function. This is unique because thermoset formulations are generally resistant to water and water based fluids, instead having significant swelling characteristic with hydrocarbon based hydraulic fluids (mineral oil, PAG, POE, naphthenic, etc.). In some embodiments, the present disclosure provides advantages over water swellable elastomeric or rubber materials comprising superabsorbent polymers which may not be amenable for use with various glycol applications and in which exposure to saline solution may reduce swelling.

A series of novel additives have been identified that when added to otherwise water resistant elastomeric material such as an acrylonitrile butadiene rubber (NBR) can produce a very high degree of swell up to 200%. These additives can be incorporated without significant loss of basic physical material properties. This technology may be used to fabricate seals, O-rings, and hose products resistant to potential leaks with water-based fluids and hydraulic fluids.

Potential applications for an article prepared from the water-swellable elastomeric compositions include use as a backing seal that upon swelling will migrate into the damaged interstice of the primary seal and limit leakage at that localized point. This swelling action will be in response to the fluid in the system crossing the initial barrier through an imperfection in the primary seals' integrity.

In one embodiment, a self-healing hydraulic backing seal is provided prepared from a water-swellable composition comprising a base polymer and a plant-based polysaccharide. The self-healing backing seal is designed to flow and fill a cut or damage to the primary seal. In some embodiments, the composition further comprises a diffusion promoter and a fluid retaining agent. In embodiments, the composition further comprises one or more of a reinforcing filler, plasticizer, curing agent, activator, scavenger, colorant, and/or biocide according to the disclosure.

Rubber

In some embodiments, a water-swellable elastomeric composition is provided comprising a base polymer and a plant-based polysaccharide. The base polymer is selected from acrylonitrile butadiene rubber (NBR), carboxylated acrylonitrile butadiene rubber, hydrogenated acrylonitrile butadiene rubber, carboxylated hydrogenated acrylonitrile butadiene rubber, acrylonitrile butadiene rubber/polyvinyl chloride blend (NBR/PVC), chlorobutyl rubber (CIIR), ethylene-propylene-diene rubber (EPDM), chlorinated polyethylene rubber (CPE), chlorosulfonated polyethylene rubber (CSM), and mixtures or blends thereof. In a specific embodiment, the base polymer is an acrylonitrile butadiene rubber (NBR). In another specific embodiment, the base polymer is 19-51%, 26-49%, or 20-33% acrylonitrile butadiene rubber. In a specific aspect, the base polymer is 20-33% acrylonitrile butadiene rubber (NBR). In embodiments, the water-swellable elastomeric composition is provided comprising a base polymer in from 20-60 wt %, 30-55 wt %, or 40-50 wt % compared to the total weight of the total composition. In some specific embodiments, the NBR is in the product range of KRYNAC® grades (LANXESS, Deutschland GmbH). In a specific aspect, the NBR is a KRYNAC 2750 C(LANXESS). In some embodiments, the base polymer is present in the composition at 100 pph.

Plant-Based Polysaccharides

A water-swellable elastomeric composition is provided comprising a base polymer and a plant-based polysaccharide. Plant-based polysaccharides have been found to be swell inducing fillers (SIFs) comprising a wicking action when embedded in an NBR composition and exposed to water, salt water, or ethylene glycol. The term "plant-based polysaccharide" is defined as a complex carbohydrate composed of 10 to up to several thousand monosaccharides arranged in chains, and derived from a plant. In some embodiments, the monosaccharides include one or more of glucose, fructose, galactose, and mannose. In some embodiments, the plant-based polysaccharide is a non-digestible polysaccharide, i.e., dietary fiber. In some embodiments, the dietary fiber includes one or more of cellulose, hemicellulose, polydextrose, inulin, beta-glucan, pectin, psyllium husk mucilage, galactomannan, gum, glucomannan, agar-agar, alginate, carrageenan, chitin, or chitosan. In some embodiments, the plant-based polysaccharide includes a pectin, cellulose, and/or hemicellulose. In some embodiments, the plant-based polysaccharide further comprises a lignin. In some embodiments, the plant-based polysaccharide comprises a dietary fiber and a lignin. In some embodiments, the plant-based polysaccharide comprises cellulose, hemicellulose, pectin and lignin. In some embodiments, the plant-based polysaccharide comprises lignin cross linked to hemicellulose. In some embodiments, the plant-based polysaccharide is selected from carrot fiber, squash fiber, yam fiber, turnip fiber, parsnip fiber, coir fiber (coconut husk), flax fiber (herbaceous plant), rice paper plant fiber (*Tetrapanax papyriferus*), palm fiber, beet fiber, apple fiber, orange fiber, and grapefruit fiber, and mixtures and blends thereof. In a specific embodiment, the plant-based polysaccharide is carrot fiber, for example, HYDROBIND™ processed carrot fiber, Bolthouse Farms, Inc.; or dry powdered carrot, ERM®-BC515 (Sigma-Aldrich). In embodiments, the plant-based polysaccharide provides a fluid wicking action to draw water or fluids into the water-swellable elastomeric composition to improve swelling characteristics when an article such as a hydraulic seal, O-ring, backing seal, packer, gasket, for example, for oil-field or automotive applications is exposed to a fluid such as water, salt water, ethylene glycol, propylene glycol, or other hydraulic fluid, mixtures thereof. In some embodiments, the fluid is a mixture of water and ethylene glycol or water and propylene glycol. In some embodiments, the fluid is a water/ethylene glycol or water/propylene glycol mixture selected from 10:90, 20:80, 30:70, 40:60, 50:50, 60:40, 70:30, 80:20, or 90:10 v/v. In a specific aspect, the fluid is water/ethylene glycol 50:50 v/v mixture. In some embodiments, the water-swellable elastomeric composition comprises a dried plant-based polysaccharide for fluid wicking in from 5-50, 10-40, 20-30 or 15-25 wt %; or 10-100 pph, 20-80 pph, 30-70 pph, or 40-60 pph. In some aspects, the plant-based polysaccharide is not methyl cellulose. In other aspects, the plant-based polysaccharide is not carboxymethyl cellulose. Although the plant-based polysaccharide provides wicking action to draw the water, salt water or hydraulic fluid into the composition, in one aspect, an additional fluid retaining agent is desirable to retain the water or fluid and maintain the volume swell.

In another embodiment, a water-swellable elastomeric composition is provided comprising a base polymer and a plant-based polysaccharide and further comprising a fluid retaining agent. In some embodiments, the fluid retaining agent is a kaolinite, illite, chlorite, or a bentonite (montmorillonite-smectite). In some aspects the fluid retaining agent is selected from bentonite, sodium bentonite or calcium bentonite. In one aspect the fluid retaining agent is sodium bentonite. For example, in another aspect, the fluid retaining agent is a BENTOLITE®. In some aspects, the fluid retaining agent is selected from BENTOLITE 865, BENTOLITE 2422, BENTOLITE H, BENTOLITE L, BENTOLITE L 3, BENTOLITE L 10, BENTOLITE L 10C, (BYK Additives & Instruments) or mixtures and combinations thereof. In specific aspects, the fluid retaining agent is present in the composition in from 0.5-20, 1-15, or 3-7 wt %; or 5-25 pph. In some aspects, the fluid retaining agent is desirable to retain the water or fluid and maintain the volume swell.

The water-swellable elastomeric composition comprising a base polymer and a plant based polysaccharide further comprises a curing agent. A variety of various curatives or curing agents may be used (generally sulfur and at least one accelerator). Suitable curatives or curing agents may include, but are not necessarily limited to, sulfur, peroxide and their co-agents, such as VULCUP 40KE available from Crompton and triallyl isocyanurate (TAIC), and the like and an accelerator. Suitable sulfur accelerators include, but are not necessarily limited to, mercapto compounds, sulfenamides, thiuram compounds, and the like and combinations thereof. Non-limiting examples of more specific mercapto compounds include 2-mercaptobenzothiazole (MBT), mercaptobenzothiazyl disulfide (MBTS), sulfenamides such as benzothiazyl-2-t-butyl sulfenamide (TBBS), and thiurams such as tetramethyl thiuram disulfide (TMTD) and the like, and combinations thereof. In some aspects, the curing agent comprises di(benzothiazol-2-yl) disulfide (MBTS)/VULCACIT DM (LANXESS) and or elemental sulfur treated with magnesium carbonate (793C SPIDER SULFUR, Hallstar). Suitable curatives and accelerators may be each present in the range from 0.2-6, 0.5-3, or 0.5-2 wt %; or 0.1-5, or 0.5-3 pph.

The water-swellable elastomeric composition may be formulated to include additives suitably selected by one of ordinary skill in the art, which may include but are not limited to curing agents, activators, plasticizers, retarders, scavengers, accelerators, antioxidants, colorants, antiozonants, processing aids, biocides, flame retardants; or blends or mixtures thereof. Examples of suitable activators include zinc oxide (ZnO), e.g., KADOX930™ (zinc oxide, Zinc Corporation of America; Monaca, Pa.), ZANO 20 (zinc oxide, Umicore Zinc Chemicals; Angleur, Belgium), zinc stearate, stearic acid, magnesium oxide (MgO) and combinations thereof. In one aspect, zinc oxide (KADOX 930) is employed as an activator/scavenger. In another aspect, stearic acid (INDUSTRENE R) is employed as an activator/process aid. Unless otherwise specified, the additive may be employed in the composition in from 0-5, 0.1-5, 0.5-4, or 1-3 wt %; or 2.5-10, 0.5-3; or 0.5-2 pph.

In another aspect, a plasticizer is employed in the composition. In some aspects, the plasticizers dioctyl adipate (PLASTHALL DOA), trioctyl trimellitate (PLASTHALL TOTM) or ditridecyl adipate (PLASTHALL DTDA), available from Hallstar, may be used in the compositions. Unless otherwise specified, the plasticizer may be employed in the composition in from 0.2-10 wt %, 0.5-5 wt %, or 1-3 wt %; or 2.5-25, 3-15, or 5-10 pph.

In one embodiment, a water-swellable elastomeric composition is provided comprising a base polymer and a plant-based polysaccharide further comprising one or more fillers or reinforcing fillers, or combinations thereof. Various fillers such as silica, carbon black, talc, silicates, aluminum silicate, clays, and titanium dioxide may be employed. Examples of fillers used in some embodiments include: silica, for example HiSil 243 LD™ (precipitated amorphous silica from PPG Industries; Monroeville, Pa.); zinc oxide, for example calcium carbonate, for example Hubercarb Q325™ (ground calcium carbonate, Akrochem Corp.; Akron, Ohio); talc, for example Mistron® vapor R (hydrous magnesium silicate, Imerys Talc), Nytal Talc (hydrous magnesium silicate, R.T. Vanderbilt); carbon black, for example Continex™ N650 Carbon Black (carbon black, Continental Carbon; Houston, Texas), Vulcan® XC72R (powdered carbon black, Cabot Corp.; Billerica, Mass.). In one aspect, the filler is a silica reinforcing filler, for example, HI-SIL 243LD, alone or in combination with one or more other fillers. Each filler may be present in the composition from 1-30, 5-20, or 10-15 wt %; or 5-50, 10-40, or 20-35 pph.

In one embodiment, a water-swellable elastomeric composition is provided comprising a base polymer and a plant-based polysaccharide further comprising a diffusion promoter. In some embodiments, the diffusion promoter is selected from sodium acetate, potassium acetate, sodium formate, potassium formate, sodium triphosphate, potassium triphosphate, sodium polyphosphate, potassium polyphosphate, sodium carbonate, potassium carbonate, or mixtures and combinations thereof. In some aspects, the composition comprises an organic diffusion promoter selected from sodium acetate, potassium acetate, sodium formate, potassium formate and an inorganic diffusion promotor selected from sodium triphosphate, potassium triphosphate, sodium polyphosphate, potassium polyphosphate, sodium carbonate, potassium carbonate, or mixtures and combinations thereof. In one aspect a water-soluble elastomeric is provided comprising sodium carbonate and sodium formate. In some aspects, each diffusion promoter may be present in the composition from 0.5-10, 1-7, or 3-5 wt %; or 2-25, 5-20, or 5-15 pph.

In some embodiments, the water-swellable elastomeric composition comprises one or more biocide compounds. In aspects, the biocide compound is selected from an antimicrobial, insecticide or rodenticide compound, or a mixture or combination thereof. For example, one or more of RODREPEL™ (C-Tech Corp., India), TERMIREPEL™ (C-Tech Corp., India), COMBIREPEL™ (C-Tech Corp., India), MICROBAN® (triclosan; Microban International), or SURCIDE PCMX (para chloro meta xylenol, Surety Laboratories) may be employed. The biocide may be present in the composition from 0-1, 0.001-0.5, or 0.01-0.2 wt %; or 0-3, 0.01-2, or 0.1-1 pph.

In some embodiments, the water-swellable elastomeric composition comprises one or more antioxidants. In one aspect, the antioxidant is selected from Antioxidant DQ (polymerized 2,2,4-trimethyl-1,2-dihydroquinoline, Akrochem Corp), Agerite MA™ (2,2,4-trimethyl-1,2-dihydroquinolone polymer) or Irgafos® 168 (tris (2,4-di-tert-butylphenyl)phosphite, Ciba), or a mixture or combination thereof. In some aspects, the antioxidant is present in the composition at from 0.1-5 wt %, 0.3-3 wt %, or 0.5-2 wt %; or 0.1-5, 0.3-3, or 0.5-2 pph.

In some embodiments, the water-swellable elastomeric composition is an uncured or curable composition. In some embodiments, the water-swellable elastomeric composition is a cured composition.

In some embodiments, an article comprising a cured water-swellable elastomeric composition is provided. In some embodiments, the article is a hydraulic seal, O-ring, backing seal, packer, gasket, for example, for oil field or automotive applications, is provided comprising a cured nitrile butyl rubber composition comprising a plant-based polysaccharide. In some embodiments, the article is an actuator used to shut off electrical current upon contact with water. In some embodiments, the article is a calking used to prevent water leakage from pipes or blocking connections in civil constructions such as subways and subsea tunnels. In some embodiments, the article is a seal for steel-made structured bodies, prefabricated culvert boxes, sealed segments, joints formed in assembly of pre-cast concrete bodies, constructions joints, and the like as a sealing material for repair of structured bodies. In some embodiments, the article is a fracturing seal for the shale oil and gas industries. In some embodiments, the article is self-healing in that a nick in the material when exposed to water, salt water, ethylene glycol (e.g., HOUGHTO-SAFE™ 273), ERIFON™ 818, propylene glycol; or other hydraulic fluid, or mixtures thereof, the seal will swell to greater than about 20%, 30%, 40%, 50%, 60%, 70%, 80%, 90%, 100%, 120%, 150%, 170%, or 200% compared to its original volume.

In a particular aspect, a self-healing hydraulic seal is provided that will swell to >50%, >75%, or >100% of its original volume when exposed to water. In another aspect, a self-healing hydraulic seal is provided that will swell to >25%, >50%, or >75% of its original volume when exposed to salt water. In another aspect, a self-healing hydraulic seal is provided that will swell to >25%, >50%, or >75% of its original volume when exposed to ethylene glycol. In another aspect, a self-healing hydraulic seal is provided that will swell to >25%, >50%, >75%, >100%, >125%, or >150% of its original volume when exposed to a mixture of water/ethylene glycol 50/50 v/v.

In one embodiment, an elastomeric material was prepared according to the disclosure comprising carrot fiber, bentonite, NBR, and $Na_2CO_3$. Following cure, the elastomeric material exhibited significant swelling in water (94%), and in ethylene glycol (53%) compared to its original volume.

In another aspect, an article prepared from a composition comprising 100 pph acrylonitrile butadiene rubber and 50 pph carrot fiber plant-based polysaccharide exhibits >126% volume swell in DI water, >80% volume swell in salt water (30.5 g/L), and >90% volume swell in ethylene glycol, compared to original, non-swelled volume.

In another aspect, an article prepared from a composition comprising 100 pph acrylonitrile butadiene rubber and 40 pph carrot fiber plant-based polysaccharide exhibits >110% volume swell in DI water, >60% volume swell in salt water (30.5 g/L), and >60% volume swell in ethylene glycol, compared to original, non-swelled volume.

In another aspect, an article prepared from a composition comprising 100 pph acrylonitrile butadiene rubber and 30 pph carrot fiber plant-based polysaccharide exhibits >90% volume swell in DI water, >45% volume swell in salt water (30.5 g/L), and >50% volume swell in ethylene glycol, compared to original, non-swelled volume.

EXAMPLES

Example 1. Material Development-Selection of Base Polymer

A study was performed to compare base polymer candidate volume swell using acrylonitrile butadiene rubber/polyvinyl chloride blend (NBR/PVC), chlorobutyl rubber (CIIR), ethylene-propylene-diene rubber (EPDM), chlorinated polyethylene rubber (CPE), chlorosulfonated polyethylene rubber (CSM), medium ACN acrylonitrile butadiene rubber (NBR), and high ACN acrylonitrile butadiene rubber (NBR). Each base polymer was formulated with carbon black, precipitated silica, plasticizer/oil and curatives. Fillers and processing aids remained consistent throughout the study. Following compounding, milling, molding and curing as shown in Example 5, the Volume Swell was assessed over 72 hours at 70° C. in $ddH_2O$/ethylene glycol 50:50 v/v mixture in accordance with ASTM D471. As shown in FIG. 1, the CSM rubber, Med ACN NBR and high ACN NBR exhibited the greatest swell volume. Due to expense of the CSM rubber, the acrylonitrile butadiene rubber base polymers were selected for further study.

Example 2. Material Development-Swell Inducing Material

Figure 2:
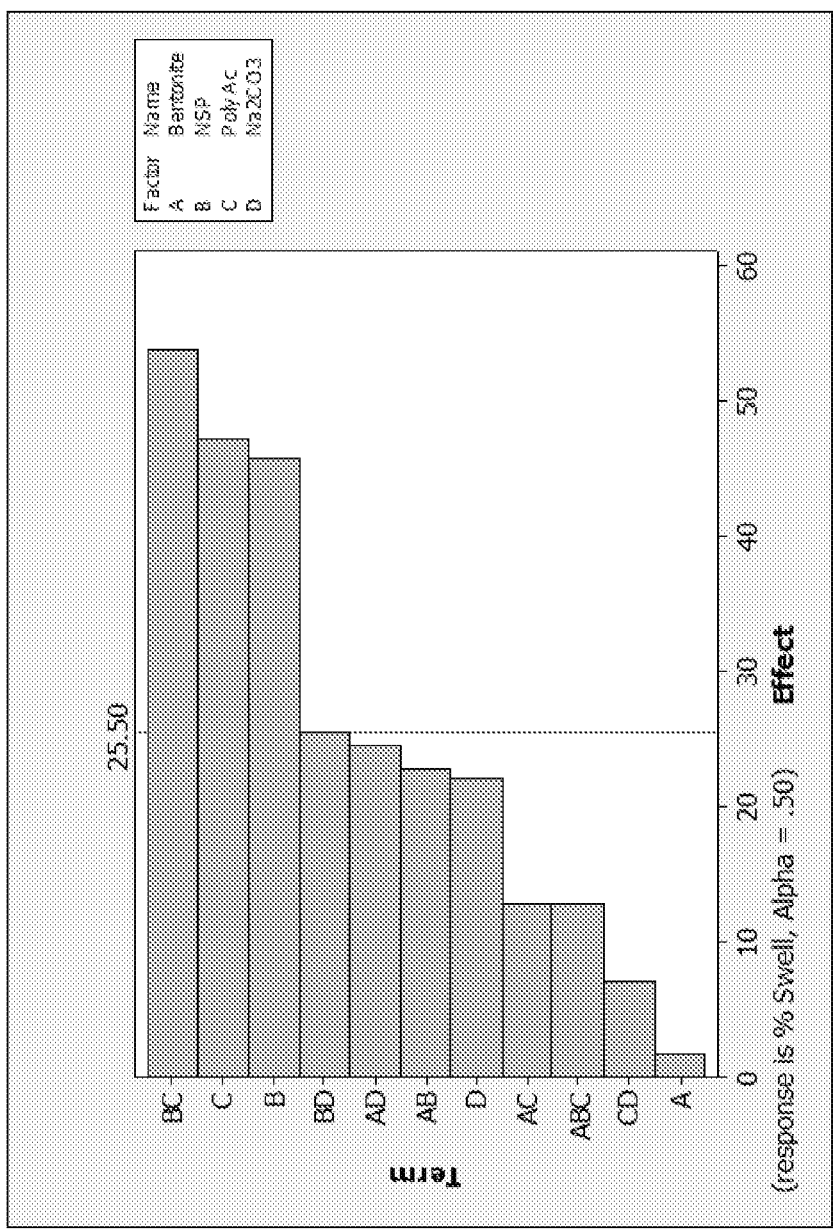
FIG. 2 shows Pareto chart of volume swell effects of swell inducing fillers (SIFs) sodium bentonite, non-starch polysaccharide (NSP), sodium polyacrylate (polyAc) and sodium carbonate ($Na_2CO_3$) on the test formulation article in $ddH_2O$/ethylene glycol 50:50 v/v at 70° C. and degree of absorption in accordance with ASTM D471. Non-starch polysaccharide, sodium acrylate, and the NSP/NaPa combination influenced material swelling to the highest extent.
Figure 3:
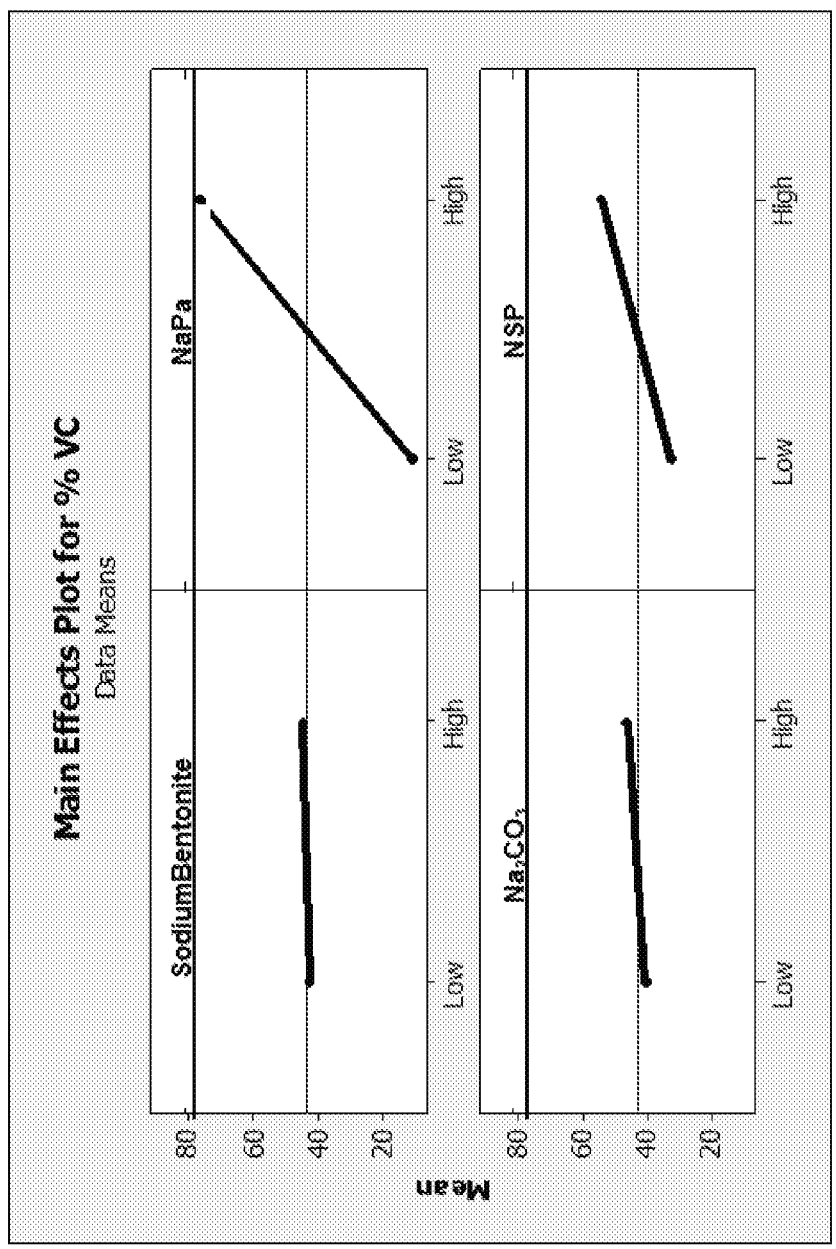
FIG. 3 shows main effects plot for % VC for % swell of test composition articles comprising swell inducing fillers sodium bentonite, non-starch polysaccharide (NSP), sodium polyacrylate (polyAc) and sodium carbonate ($Na_2CO_3$).

A base formulation comprising base polymer NBR, carbon black, precipitated silica, plasticizer/oil, and curatives was employed using candidate swelling additives or swell inducing fillers sodium bentonite, sodium polyacrylate (NaPa, Poly Ac), sodium carbonate or Non-starch Polysaccharide (NSP) (carrot fiber) The type of swelling additive was varied using a standard base recipe. The type and combination of potential swell inducing filler (SIF) that were added to the formulations to assess their capability to swell the elastomer. Levels of carbon black, silica, plasticizer and the cure package were held constant in the experiment. The compounds were cured according to their respective T90 time. Samples were exposed to $ddH_2O$ at 70° C. in accordance with ASTM D471, and degree of absorption was measured at time intervals until each material reached saturation or zero slope. A Pareto chart of volume swell effects in $ddH_2O$/ethylene glycol 50:50 v/v mixture at 70° C. is shown in FIG. 2. The main effects plot for percent swell of SIFs (% VC) is shown in FIG. 3. Non-starch polysaccharide (carrot fiber) sodium polyacrylate and the NSP/AcPa combination influenced the material swell to the highest extent.

Figure 4:
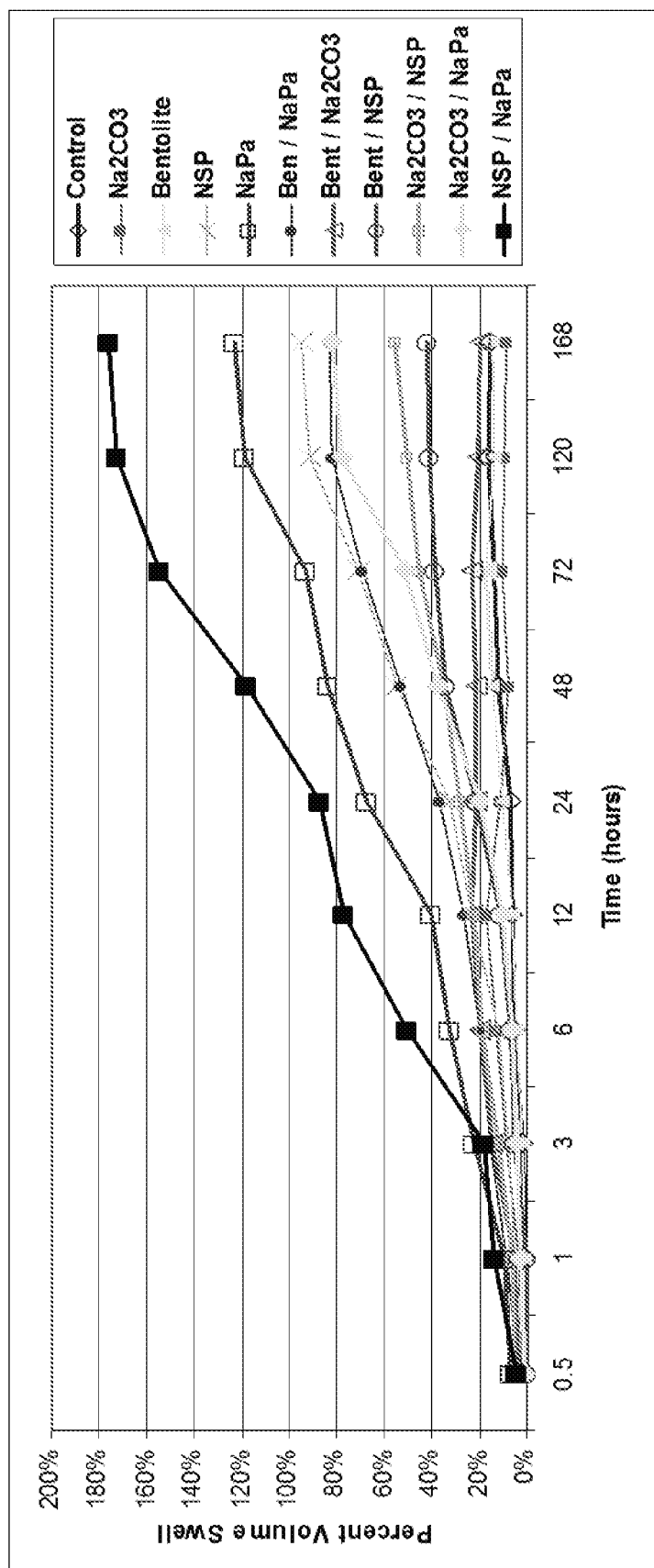
FIG. 4 shows swell kinetics of test composition articles with combinations of swell inducing fillers.

Some applications may be rate dependent and necessitate rapid engorgement in order to function. Percent volume swell readings were taken at time intervals and plotted over 168 hrs as shown in FIG. 4. Measurement continued until saturation or steady state was achieved.

Sodium concentration was further explored. A significant increase in sodium concentration and elevated free $Na^+$ content may improve the diffusion potential of the swell mechanism resulting in faster diffusion rate. Results showing $Na^+$ solution amount is shown in Table 1A. Use of a diffusion promoter containing $Na^+$ may result in a faster rate of swelling. However, use of Na+ alone is not a sustainable mechanism as $Na^+$ migrates out of the elastomeric mix.

TABLE 1A

Sodium Solution Amount in Experimental Compositions.

| Filler Type | $Na^+$ Solution Amount |
| --- | --- |
| $Na_2CO_3$ | .096 kg |
| Bentonite | .004 kg |
| NSP | .000 kg |
| NaPa | .054 kg |
| Ben/NaPa | .026 kg |
| Bent/$Na_2CO_3$ | .050 kg |
| Bent/NSP | .002 kg |
| $Na_2CO_3$/NSP | .048 kg |
| $Na_2CO_3$/NaPa | .072 kg |
| NSP/NaPa | .024 kg |

Figure 5:
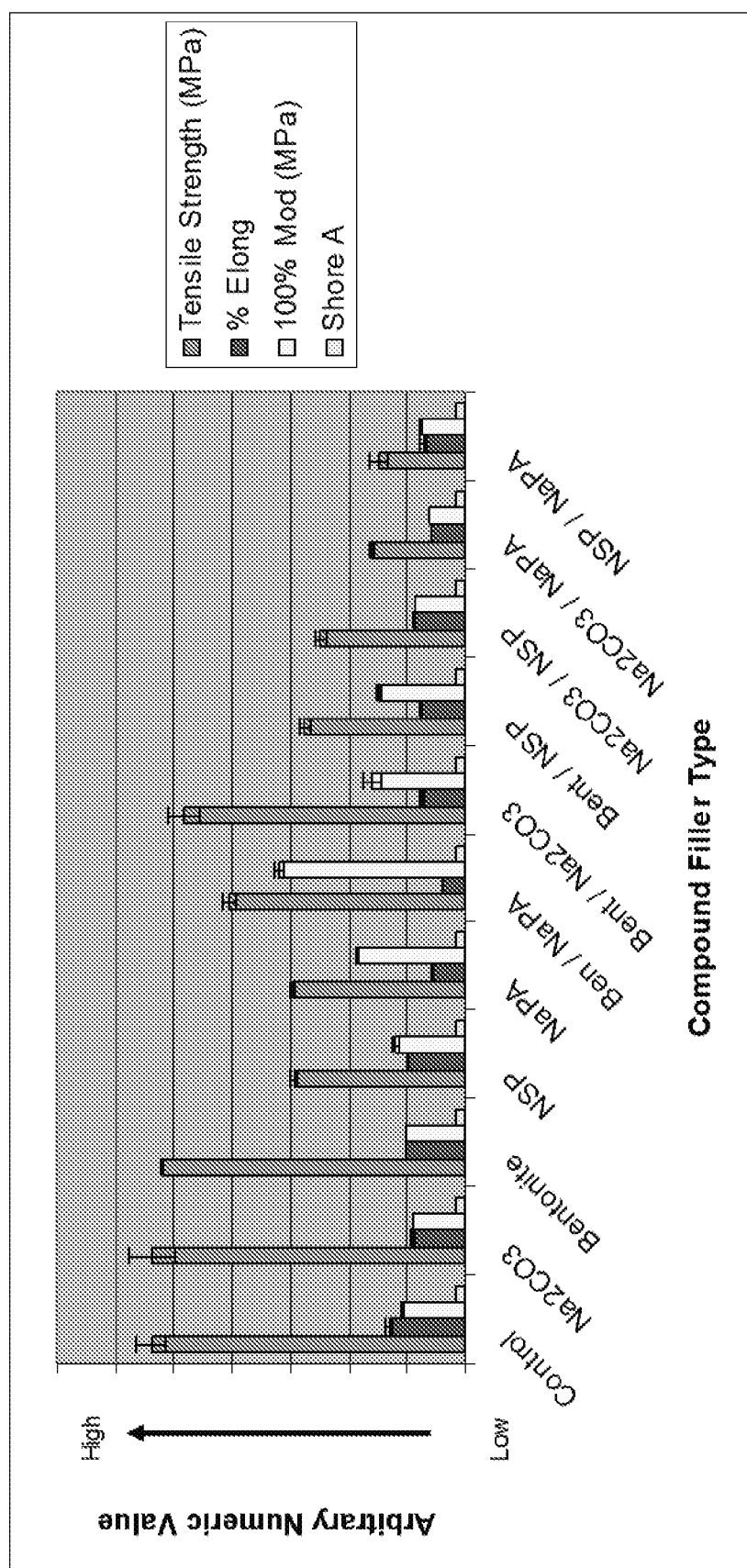
FIG. 5 shows effect on Physical Properties for various SIFs in original (unswollen) composition. The NSP and NaPa materials tended to exhibit lower tensile strength when used alone.
Figure 6:
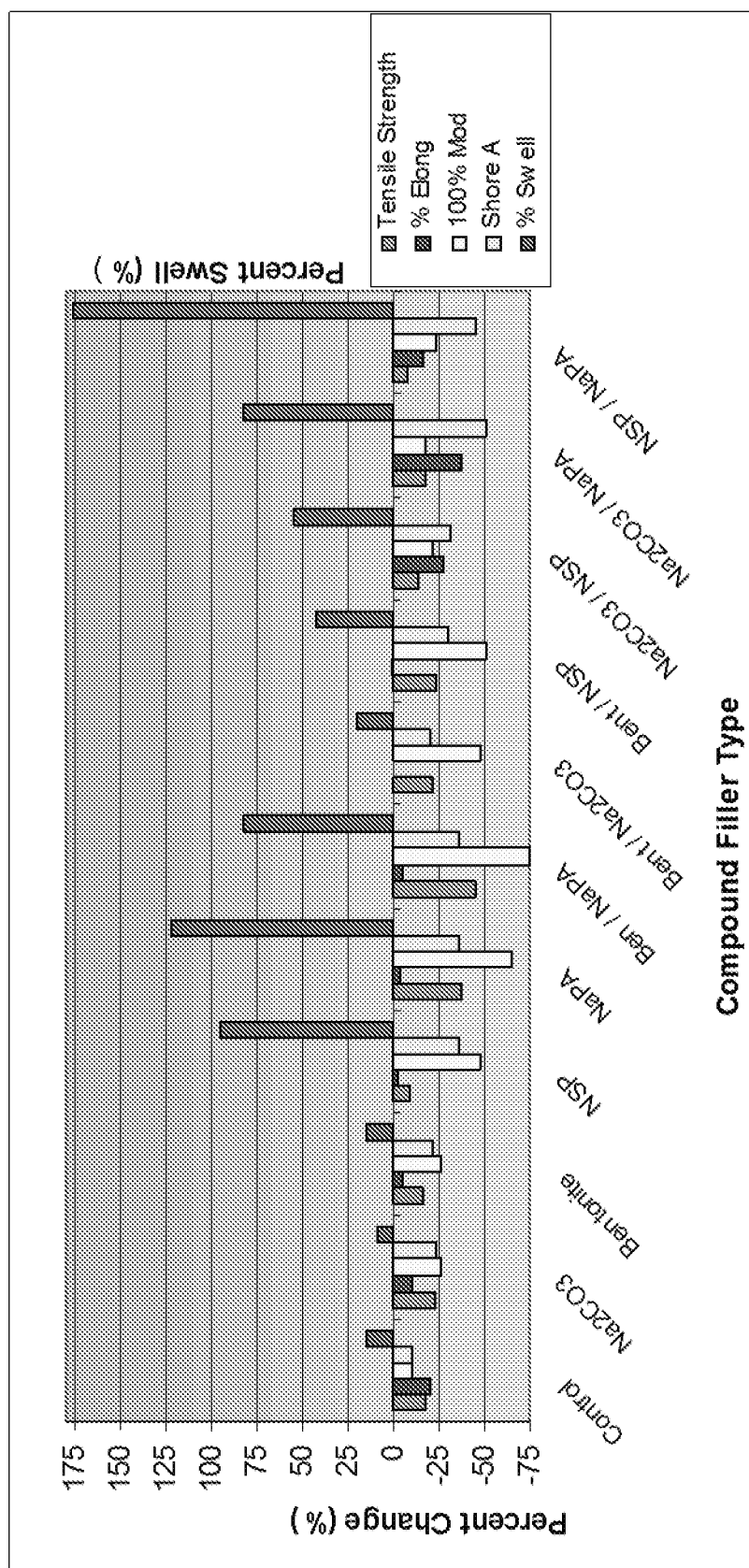
FIG. 6 shows effect on Physical Properties in swollen state as percent change from original (unswollen) composition for various SIFs. A correlation exists between total swell and percent loss of physical properties.

Physical properties of the test compositions prior to swelling, or in original form, are shown in FIG. 5. The NSP and NaPa materials tended to have lower tensile strength. Physical properties of the test compositions after swelling, or in the swollen state, as percent change from original state, are shown in FIG. 6, along with percent swelling. A correlation was exhibited between total swell and percent loss of physical properties. NSP and NaPa filled materials had the largest percent change values.

Example 3. Test Compositions-Regression Volume Swell Kinetics

Test compositions were prepared varying the amount of the fluid wicking material plant-based polysaccharide carrot fiber. The compositions were formulated as shown in Example 5, using mix program 7 by addition of polymer, then 2S, then 3S successively, and test articles were prepared. The amount of swelling of each article in water or ethylene glycol was determined by the method of Example 5 and is shown at the bottom of Table 1B.

TABLE 1B

Test Compositions comprising varying amounts of carrot fiber

| | 1 | 2 | 3 | 4 | 5 |
|---|---|---|---|---|---|
| Ingredients, pph | | | | | |
| Krynac 2750 C | 100.00 | 100.00 | 100.00 | 100.00 | 100.00 |
| Plasthall DOA | 5.00 | 5.00 | 5.00 | 5.00 | 5.00 |
| KADOX 930 (ZNO) | 5.00 | 5.00 | 5.00 | 5.00 | 5.00 |
| INDUSTRENE R (STEARIC) | 1.50 | 1.50 | 1.50 | 1.50 | 1.50 |
| ANTIOXIDANT DQ | 1.50 | 1.50 | 1.50 | 1.50 | 1.50 |
| MBTS/VULKACIT DM | 1.50 | 1.50 | 1.50 | 1.50 | 1.50 |
| 793C-SPIDER SULFUR | 2.00 | 2.00 | 2.00 | 2.00 | 2.00 |
| Bentolite | 10.00 | 10.00 | 10.00 | 10.00 | 10.00 |
| Carrot Fiber | 10.00 | 20.00 | 30.00 | 40.00 | 50.00 |
| AKROSPERSE 42 ORANGE MB | 2.50 | 2.50 | 2.50 | 2.50 | 2.50 |
| HI-SIL 243 LD | 30.00 | 30.00 | 30.00 | 30.00 | 30.00 |
| Rhenofit NACO (Sodium carbonate) | 10 | 10 | 10 | 10 | 10 |
| Na Formate | 10 | 10 | 10 | 10 | 10 |
| Swelling Data, vol. %, After 168 h in Water or Ethylene Glycol | | | | | |
| Composition | | | | | |
| Ethylene Glycol | 2.6 | 16.49 | 53.94 | 61.38 | 92.35 |
| Water | 1.12 | 14.39 | 94.42 | 110.96 | 126.59 |

Figure 7:
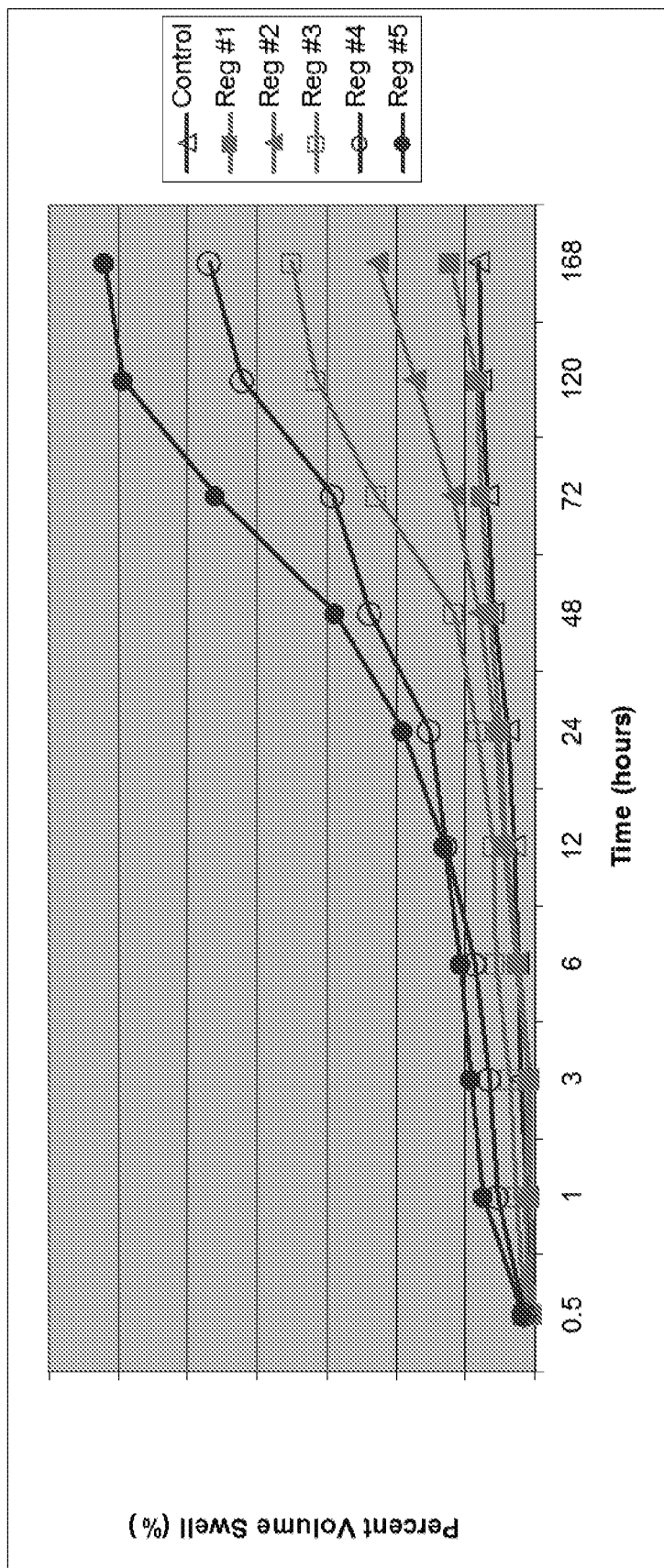
FIG. 7 shows regression volume swell kinetics resulting from increasing amounts of fluid wicking swell inducing filler (carrot fiber) in the compositions.
Figure 8:
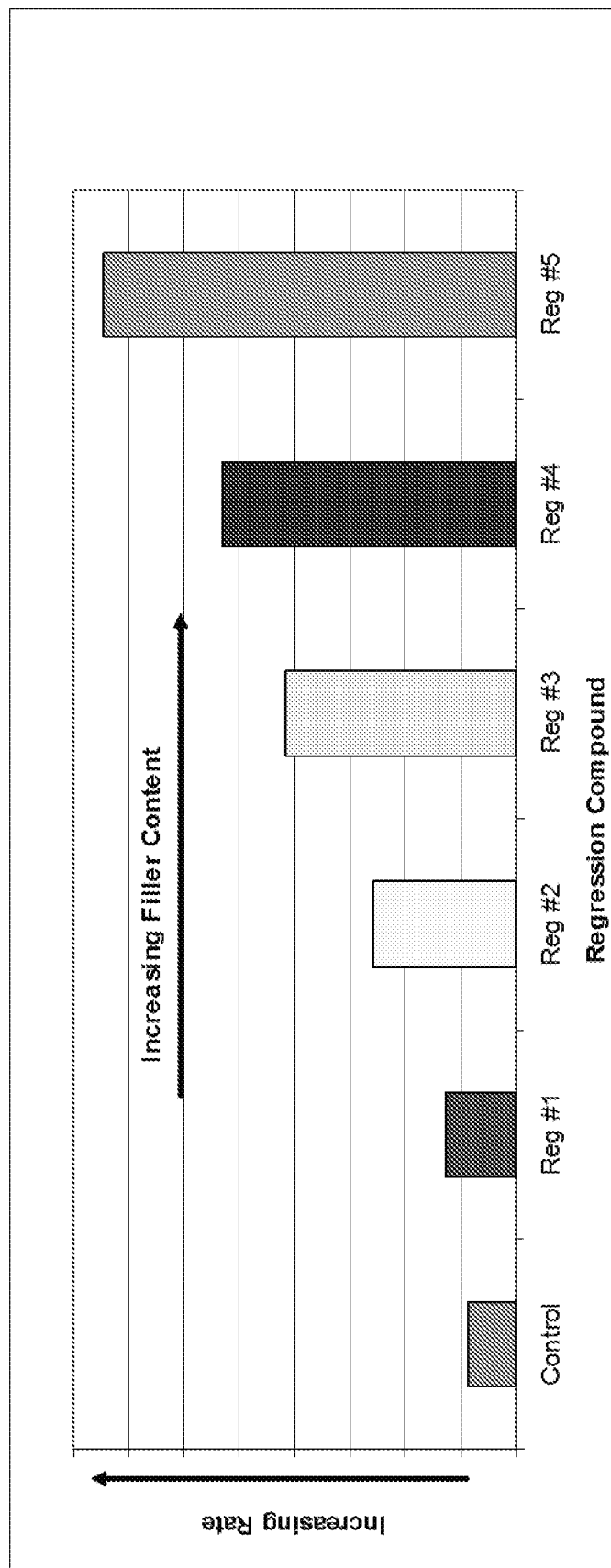
FIG. 8 shows increasing regression kinetic rate correlates to increasing filler content from calculated velocity to reach material saturation (steady state).
Figure 9:
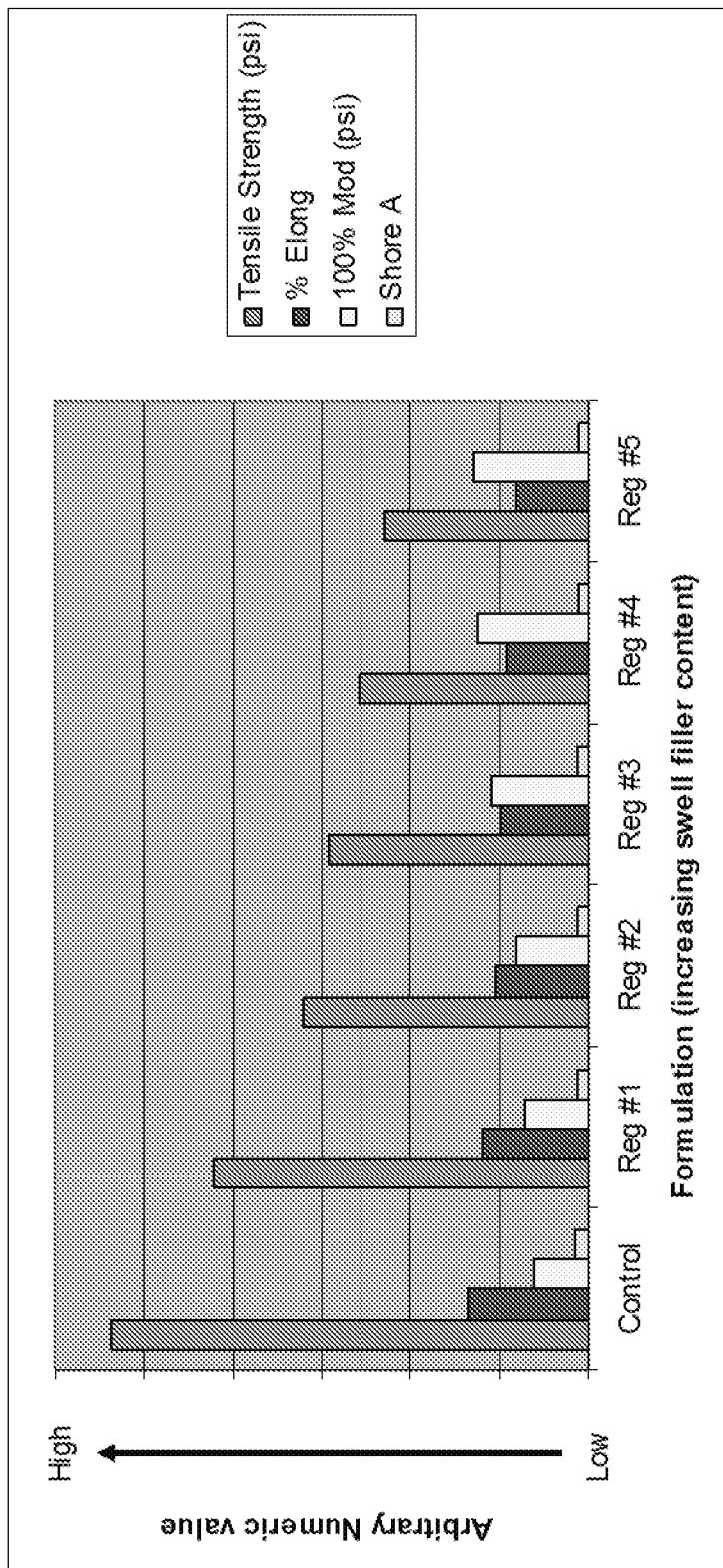
FIG. 9 shows regression physical properties in original state, prior to material swelling, for compositions with increasing amounts of fluid wicking swell inducing filler (carrot fiber).
Figure 10:
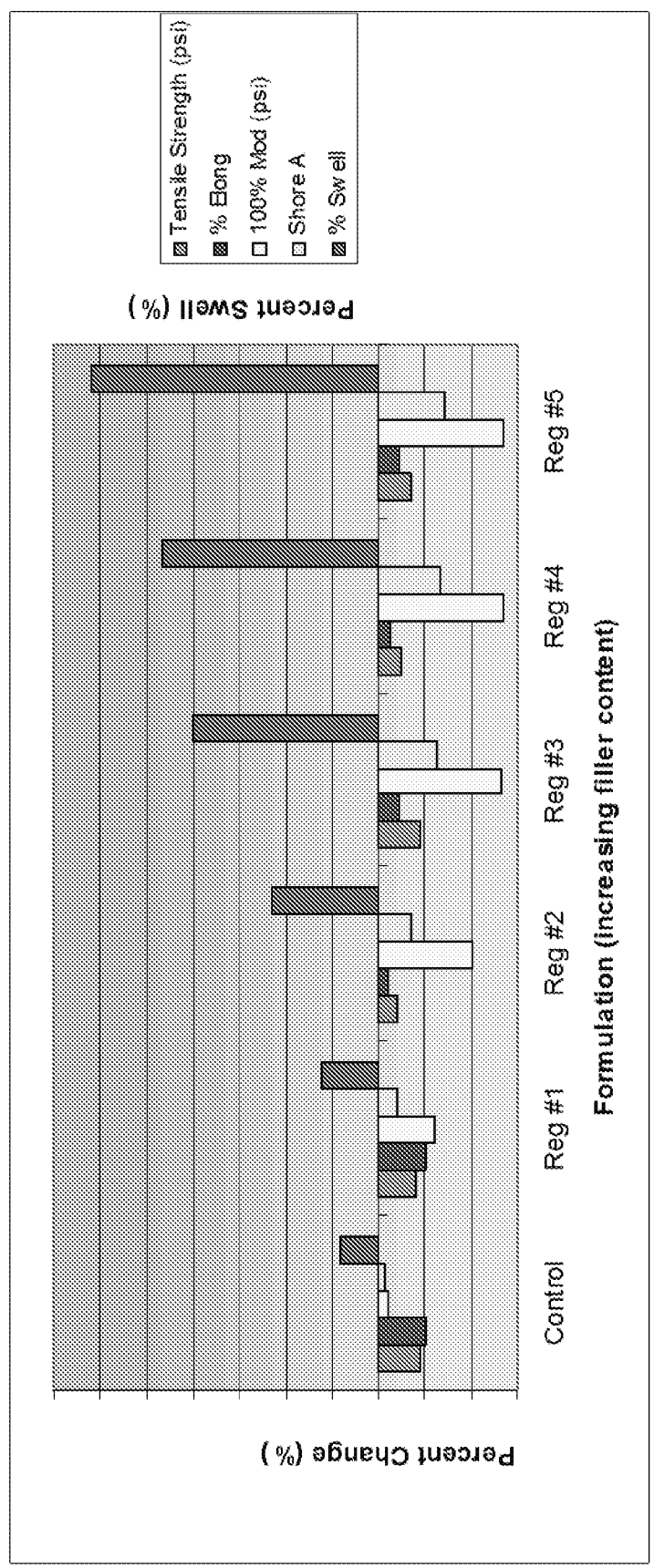
FIG. 10 shows regression physical properties in swollen state as percent change from original (unswollen) composition for compositions with increasing amounts of fluid wicking swell inducing filler (carrot fiber).

Regression volume swell kinetics in water/ethylene glycol 50:50 v/v mixture for Reg. #1-5 of Table 1B, and a Control Formulation are shown in FIG. 7. The Control formulation did not contain carrot fiber, but otherwise contained components shown in Table 1B. As shown in FIGS. 7 and 8, an increasing amount of carrot fiber up to 50 pph was employed, an increasing rate of swelling was exhibited. FIG. 9 shows Original (unswollen) physical properties of each Regression Formulation compared to control. An increasing SIF carrot fiber content reduces tensile strength and percent elongation. FIG. 10 shows physical properties of each Regression Formulation in the swollen state compared to Original (unswollen) state. An increasing amount of SIF results in increased percent swell and is accompanied by decreased 100% modulus (psi).

Example 4. Test Composition and Physical Properties

A swelling material was prepared by formulating the composition with the materials in Table 1C.

TABLE 1C

Test Composition 5.

| Ingredients | PPH | % | Function |
|---|---|---|---|
| Krynac 2750 C | 100 | 44 | Polymer |
| Plasthall DOA | 5 | 2 | Plasticizer |
| KADOX 930 (ZNO) | 5 | 2 | Activator/scavenger |
| INDUSTRENE R (STEARIC) | 2 | 1 | Activator/process aid |
| ANTIOXIDANT DQ | 2 | 1 | Antioxidant |
| MBTS/VULKACIT DM | 2 | 1 | Curative |
| 793C-SPIDER SULFUR | 2 | 1 | Curative |
| Bentolite | 10 | 4 | Fluid retain |
| Carrot Fiber (Hydrobind) | 50 | 22 | Fluid Wicking |
| AKROSPERSE 42 ORANGE MB | 3 | 1 | Colorant (optional) |
| HI-SIL 243 LD | 30 | 13 | Silica reinforcement |
| Rhenofit NACO (Sodium carbonate) | 10 | 4 | Diffusion promoter |
| Na Formate | 10 | 4 | Diffusion promoter |
| Totals: | 229 | 100 | |

Figure 11:
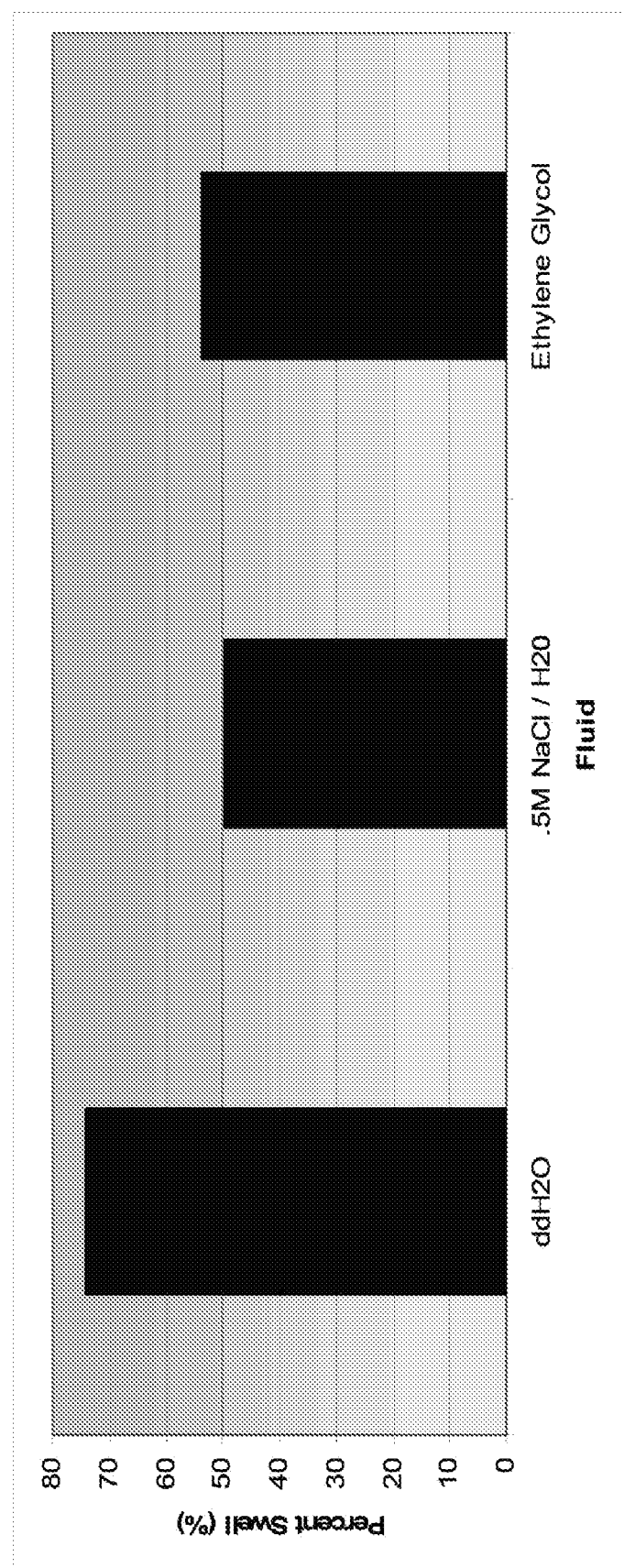
FIG. 11 shows relative percent swell in water, salt water, or ethylene glycol after 168 hrs for test article compared from test composition 5 of Example 4.
Figure 12A:
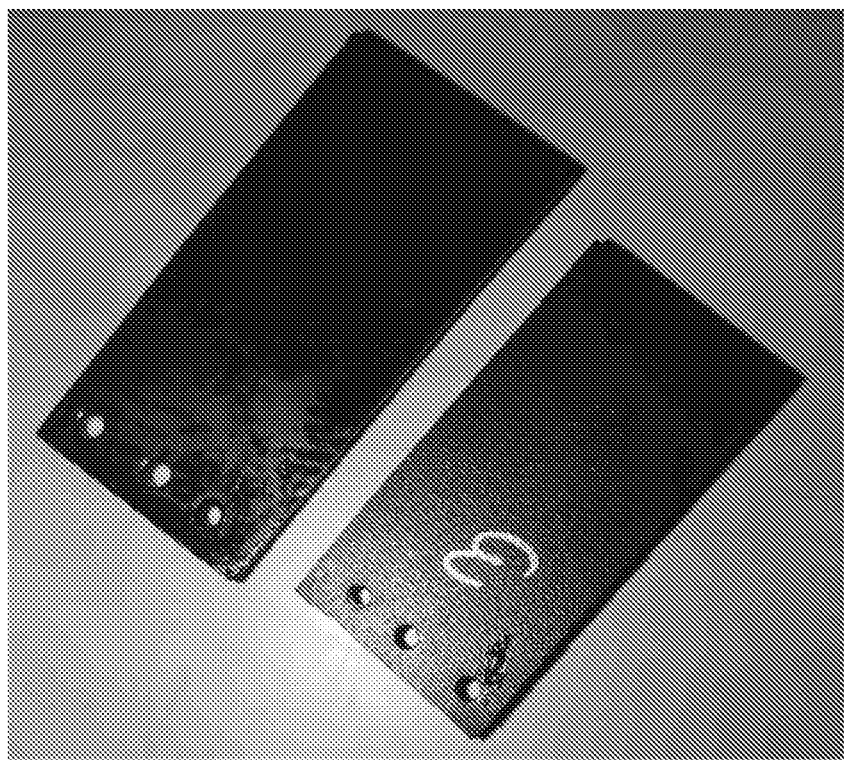
FIG. 12A shows a sample rectangular test article exhibiting 40-50% swell in relation to the non-treated control.
Figure 12C:
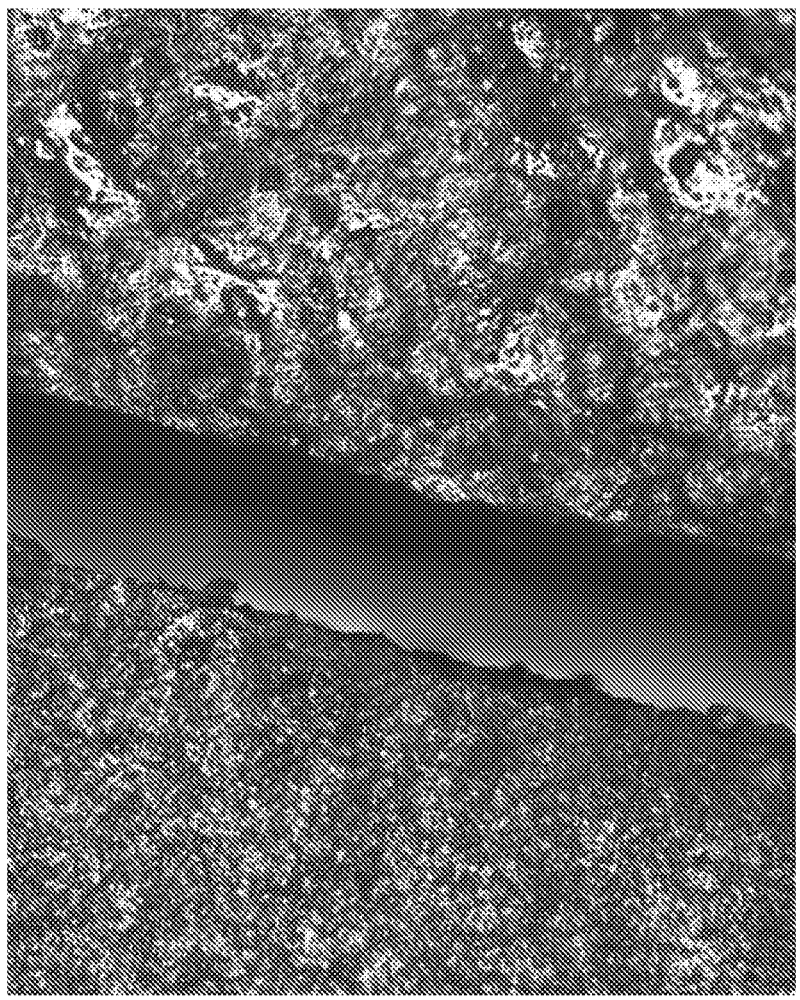
FIG. 12C shows 5× magnification of exposed sample and untreated control slab. Large pockets of retained fluid are apparent in the experimental sample.
Figure 12B:
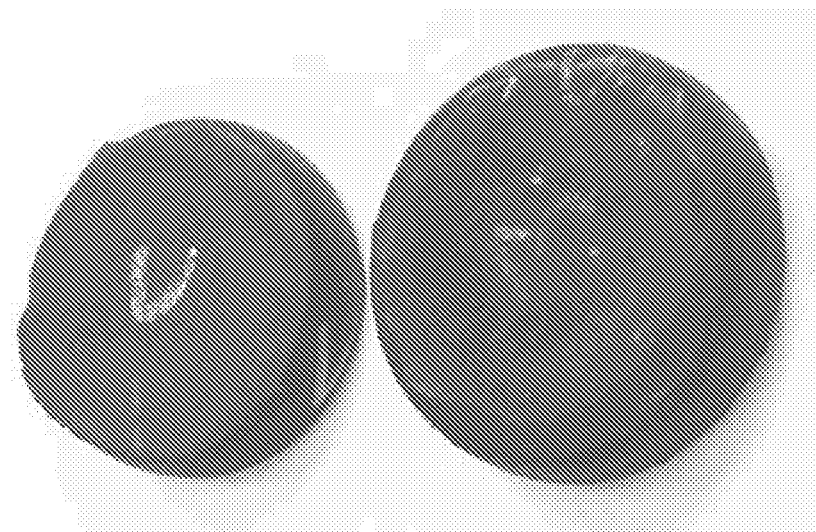
FIG. 12B shows a swollen sample disc shaped test article in relation to non-treated control.

The test composition of Table 1C was processed and articles prepared according to example 5. Sample articles were exposed for 168 hrs at 70° C. and tested for volume swell in ddH$_2$O, 0.5M NaCl/H$_2$O, and ethylene glycol. The relative percent swelling is shown in FIG. 11. Visual appearance of test articles is shown in FIGS. 12A-C. FIG. 12A shows 40-50% swell in relation to the non-treated control. FIG. 12B shows disc shaped test articles in swollen and original unswollen states. FIG. 12C shows 5× magnification of exposed sample and its control slab. Note pockets of retained fluid in the experimental sample.

Example 5. Preparation and Assessment of Rubber Formulations and Articles

The composition of Examples 1, 2 or 3 was formulated by mixing with a Banbury rubber mixer, milling the rubber and applying to seal dimensional mold followed by curing the article.

In a first example, a Banbury™ mixer (Farrel Corporation) was used to mix the different rubber formulations according to ASTM D 3182-07. First, the polymer was added first into the mixer in a 30 second mastication cycle at a temperature selected from 150° F. Second, fillers and liquids were added in a 120 second mix cycle at 230° F. Then, process aids, such as vulcanizing agents, were added in a 120 second mix cycle at 240° F. Fourth, the composition undergoes a fourth mix cycle for 120 seconds at 250° F. Then the master batch rubber is inserted into the mixer with the curatives and mixed for 90 seconds at 250° F., followed by a final mix for 120 seconds at 180° C.

After the rubber drops from the mixer, the rubber was manually applied to a dual-roll mill according to ASTM B 947. The dual roller mill stage sheets and cools the mixed formulation. The cure kinetics of the rubber formulations were assessed according to ASTM D 2084 (cure study). Based on T90 values from the cure study, the sheeted material from the dual roller mill was applied to a seal dimensional mold, followed by curing the article.

Swelling assessment of the rubber article was performed in accordance with ASTM D471 by exposing to water, salt water, ethylene glycol, or a mixture of water/ethylene glycol 50:50 v/v at 70° C. and degree of absorption was measured at time intervals until each material reached saturation or zero slope. Physical properties including Tensile strength, percent elongation, 100% modulus, and other physical properties were tested in accordance with ASTM D412. Fluid aging was tested according to ASTM D471. Shore A hardness test is performed in accordance with ASTM D2240. Compression set is performed in accordance with ASTM D395.

Additional Methods for mixing Batches #1-10 in a Banbury mixer were tested with the formulations of the disclosure, as shown in Tables 2-11.

TABLE 2

Master batch Mix Program #1

| Type | Action | Ingredient | Temp. limit ° F. | Time (sec) | Rotor speed (rpm) | Cooling water temp. ° F. |
|---|---|---|---|---|---|---|
| Master-batch 220° F. Dump | | Polymer | 150 | 0 | 55 | 50 |
| | | Black, #1 Hand-adds, Liquids | 200 | 30 | 55 | 50 |
| | Sweep | #2 Hand-adds | 200 | 120 | 55 | 50 |
| | Sweep | | 220 | 120 | 55 | 50 |
| | Dump | | 220 | 90 | 100 | 50 |
| | | Total time: | | 360 | | |

TABLE 3

Master Batch Mix Program #2

| Type | Action | Ingredient | Temp. limit ° F. | Time (sec) | Rotor speed (rpm) | Cooling water temp. ° F. |
|---|---|---|---|---|---|---|
| Master-batch 250° F. Dump | | Polymer | 150 | 0 | 65 | 80 |
| | | Black, #1 Hand-adds, Liquids | 230 | 30 | 65 | 80 |
| | Sweep | #2 Hand-adds | 240 | 120 | 65 | 80 |
| | Sweep | | 250 | 120 | 65 | 80 |
| | Dump | | 250 | 90 | 100 | 80 |
| | | Total time: | | 360 | | |

TABLE 4

Master Batch Mix Program #3

| Type | Action | Ingredient | Temp. limit ° F. | Time (sec) | Rotor speed (rpm) | Cooling water temp. ° F. |
|---|---|---|---|---|---|---|
| Master-batch 280° F. Dump | | Polymer | 210 | 0 | 77 | 110 |
| | | Black, #1 Hand-adds, Liquids | 260 | 30 | 77 | 110 |
| | Sweep | #2 Hand-adds | 270 | 120 | 77 | 110 |
| | Sweep | | 280 | 120 | 77 | 110 |
| | Dump | | 280 | 90 | 100 | 110 |
| | | Total time: | | 360 | | |

TABLE 5

Master Batch Mix Program #4

| Type | Action | Ingredient | Temp. limit ° F. | Time (sec) | Rotor speed (rpm) | Cooling water temp. ° F. |
|---|---|---|---|---|---|---|
| Master-batch 300° F. Dump | | Polymer | 270 | 0 | 77 | 140 |
| | | Black, #1 Hand-adds, Liquids | 270 | 60 | 77 | 140 |
| | Sweep | #2 Hand-adds | 290 | 120 | 77 | 140 |
| | Sweep | | 300 | 120 | 77 | 140 |
| | Dump | | 300 | 60 | 100 | 140 |
| | | Total time: | | 360 | | |

TABLE 6

Curative addition Batch Mix Program #5

| Type | Action | Ingredient | Temp. limit ° F. | Time (sec) | Rotor speed (rpm) | Cooling water temp. ° F. |
|---|---|---|---|---|---|---|
| 2nd pass, Low temp | | ½ Master-batch, curatives, remaining master-batch | 150 | 0 | 50 | 50 |
| | Sweep | | 180 | 120 | 50 | 50 |
| | Dump | | 180 | 120 | 100 | 50 |
| | | Total time: | | 240 | | |

TABLE 7

Curative addition Batch Mix Program # 6

| Type | Action | Ingredient | Temp. limit ° F. | Time (sec) | Rotor speed (rpm) | Cooling water temp. ° F. |
|---|---|---|---|---|---|---|
| 2nd pass, High temp | | ½ Master-batch, curatives, remaining master-batch | 220 | 0 | 55 | 50 |
| | Dump | | 220 | 240 | 100 | 50 |
| | | Total time: | | 240 | | |

TABLE 8

One Pass Mix Batch Mix Program #7

| Type | Action | Ingredient | Temp. limit ° F. | Time (sec) | Rotor speed (rpm) | Cooling water temp. ° F. |
|---|---|---|---|---|---|---|
| 1 Pass mix 220° F. Dump | | Polymer | 150 | 0 | 55 | 50 |
| | | Black, #1 Hand-adds, Liquids | 200 | 30 | 55 | 50 |
| | Sweep | #2 Hand-adds | 210 | 120 | 55 | 50 |
| | Sweep | Curatives | 220 | 120 | 55 | 50 |
| | Dump | | 220 | 120 | 100 | 50 |
| | | Total time: | | 390 | | |

TABLE 9

One Pass Mix Batch Mix Program #8

| Type | Action | Ingredient | Temp. limit ° F. | Time (sec) | Rotor speed (rpm) | Cooling water temp. ° F. |
|---|---|---|---|---|---|---|
| 1 Pass mix 250° F. Dump | | Polymer | 150 | 0 | 55 | 70 |
| | | Black, #1 Hand-adds, Liquids | 230 | 30 | 55 | 70 |
| | Sweep | #2 Hand-adds | 240 | 120 | 55 | 70 |
| | Sweep | Curatives | 250 | 120 | 55 | 70 |
| | Dump | | 250 | 120 | 100 | 70 |
| | | Total time: | | 390 | | |

TABLE 10

One Pass Mix Batch Mix Program #9

| Type | Action | Ingredient | Temp. limit ° F. | Time (sec) | Rotor speed (rpm) | Cooling water temp. ° F. |
|---|---|---|---|---|---|---|
| 1 Pass mix 280° F. Dump | | Polymer | 150 | 0 | 70 | 110 |
| | | Black, #1 Hand-adds, Liquids | 260 | 30 | 70 | 110 |
| | Sweep | #2 Hand-adds | 270 | 120 | 70 | 110 |
| | Sweep | Curatives | 280 | 120 | 70 | 110 |
| | Dump | | 280 | 120 | 100 | 110 |
| | | Total time: | | 390 | | |

TABLE 11

One Pass Mix Batch Mix Program #10

| Type | Action | Ingredient | Temp. limit ° F. | Time (sec) | Rotor speed (rpm) | Cooling water temp. ° F. |
|---|---|---|---|---|---|---|
| HLA Recipe | | Add nano clay, talc, black, Polymer. | 350 | 60 | 50 | 50 |
| | Sweep | | 350 | 200 | 50 | 50 |
| | Sweep | Add hand ads | 350 | 200 | 50 | 50 |
| | Sweep | | 350 | 80 | 50 | 50 |
| | Dump | | 350 | | 100 | 50 |
| | | Total time: | | 540 | | |

Example 6. Backing Seal-Conceptual Application

Figure 13A:
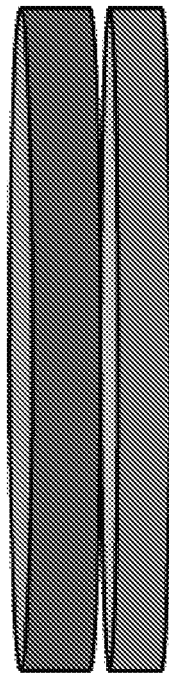
FIG. 13A shows a horizontal view of a backing seal application comprising the swelling elastomer for use with a PTFE seal.
Figure 13B:
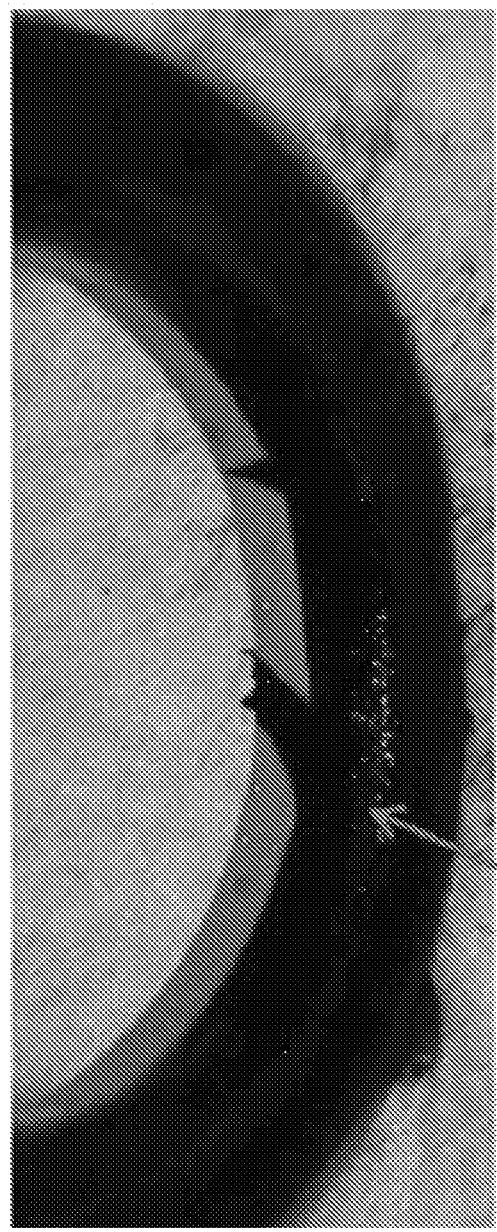
FIG. 13B is a photograph showing a backing seal application in which a test article O-ring backing seal exhibited self-healing flow in front of a nicked PTFE seal.

A test article backing seal was prepared from the water-swellable elastomeric composition according to Example 4 by the method of Example 5. The test article was employed in a Trelleborg cylinder test as a backing seal to a PTFE seal, as illustrated in FIG. 13A. Seal testing was performed using a hydraulically actuated test rig to measure seal leakage. The sealing system was enclosed in a specially designed gland that allowed for water/ethylene glycol 50:50 v/v fluid to circulate in and around the seal while maintaining a constant pressure of 3000 psi. Experimental PTFE seals were nicked 0.009". The swelling elastomer in the backing seal did "flow" and fill the induced cut as shown in the photograph in FIG. 13B. Leakage rates of the Trelleborg cylinder testing o-ring with swelling elastomer as a backing seal in water/ethylene glycol 50:50 v/v are shown in Table 12.

TABLE 12

Leakage Rates of O-ring with Swelling Elastomer Backing Seal

| Time | Pressure | Experimental (avg) | Nicked Control (avg) | Control (avg) |
|---|---|---|---|---|
| 0 Hr | 3000 psi | 10.42 g/min | NA | NA |
| 1 Hr | 3000 psi | 0.25 g/min | 12000.00 g/min | 0.2 g/min |
| 96 Hr | 3000 psi | 0.65 g/min | NA | NA |

In this experiment, the prototype backing seal flowed in front of the PTFE seal and significantly reduced the leakage rates compared to the nicked control at 1 hr. Within 1 hr, the self-healing backing seal reduced the average leakage rate to less than 3% of the initial average leakage rate at 3000 psi. Significantly reduced average leakage rates were essentially maintained over the 96 hr test period. At 96 hr, the self-healing backing seal maintained the average leakage rate at less than 7% of the initial average leakage rate at 3000 psi.

Example 7. Percent Swell Data for Various Test Articles

Various test articles were prepared from formulations of the disclosure by varying components and compared to a control test article prepared from a EPDM formulation without a swell inducing filler is shown in Table 13. Table 13 entries 2-6 were prepared from formulations shown in Table 1B, samples 1-5, respectively, comprising acrylonitrile butadiene rubber 100 pph and either 10 pph, 20 pph, 30 pph, 40 pph and 50 pph carrot fiber respectively. Table entry 1 comprises the formulation of Table 1B, except no carrot fiber was employed. Table entries 7-11 each comprise varying amounts of materials in Table 1B, and each include carrot fiber plant-based polysaccharide.

TABLE 13

Swell Data for Various Self-healing Seal Formulations, % volume swell compared to original.

| Lab Mix | Di H2O | Salt Water 30.5 g/liter | MINERAL OIL | ERIFON 818 | HOUGHTO-SAFE 273-CTF |
|---|---|---|---|---|---|
| EPDM comparative | 0.03 | n/a | 56.36 | 0.73 | 0.98 |
| 1 | 1.01 | n/a | 51.88 | 1.25 | 2.15 |
| 2 | 1.12 | n/a | 53.54 | 1.71 | 2.60 |
| 3 | 14.39 | n/a | 91.39 | 13.20 | 16.49 |
| 4 | 94.42 | 49.70 | | 53.77 | 53.94 |
| 5 | 110.96 | 61.97 | | 59.68 | 61.38 |
| 6* | 126.59 | 81.07 | | 91.03 | 92.35 |
| 7 | 196.90 | 87.05 | | 93.43 | 84.32 |
| 8 | 101.74 | 70.62 | | 69.89 | 72.46 |
| 9 | 182.65 | 94.70 | | 87.54 | 94.34 |
| 10 | 57.36 | 25.33 | | 35.74 | 42.37 |
| 11 | 56.65 | 29.86 | | 41.81 | 53.58 |

*6 is the recipe tested in the cylinder application of Example 6.

Data for physical properties of the various self-healing seal formulations is shown in Table 14. Table 14 entries 2-6 were prepared from formulations shown in Table 1B, samples 1-5, respectively. Articles prepared from formulations comprising NBR and plant-based polysaccharide exhibited increasing % volume swell when increasing amount of carrot fiber was employed in the composition.

TABLE 14

Physical data for Various Self-healing Seal Formulations

| Lab Mix | Di H2O | Tensile (psi) | % Elongation | 100% Modulus |
|---|---|---|---|---|
| EPDM | 0.03 | n/a | n/a | n/a |
| 1 | 1.01 | n/a | n/a | n/a |
| 2 | 1.12 | n/a | n/a | n/a |
| 3 | 14.39 | n/a | n/a | n/a |
| 4 | 94.42 | 808.19 | 470.87 | 485.64 |
| 5 | 110.96 | 667.85 | 478.60 | 446.13 |
| 6* | 126.59 | 657.49 | 413.90 | 464.06 |
| 7 | 196.90 | 590.41 | 390.10 | 431.05 |
| 8 | 101.74 | 525.57 | 431.80 | 327.07 |
| 9 | 182.65 | 628.89 | 395.00 | 408.59 |
| 10 | 57.36 | 1059.46 | 407.07 | 582.50 |
| 11 | 56.65 | 945.37 | 492.37 | 521.03 |

*6 is the recipe tested in cylinder application

The above specification, examples and data provide a complete description of the manufacture and use of the composition of the invention. Since many embodiments of the invention can be made without departing from the spirit and scope of the invention, the invention resides in the claims hereinafter appended.

REFERENCES

U.S. Pat. No. 4,590,227 discloses a homogeneous mixture of an elastomer, a water-absorbent resin and a water soluble resin.

U.S. Pat. No. 5,738,664 discloses a self-healing seal for use in medical devices.

U.S. Pat. No. 8,490,707, which is incorporated herein by reference, discloses an oilfield apparatus and method comprising a swellable elastomer containing a water swelling inorganic material such as a cement (e.g., Portland cement), or metal oxide (e.g., magnesium oxide, MgO), and optionally a superabsorbent polymer (e.g., polyacrylic acid). Such materials swell and stiffen upon exposure to water.

U.S. Patent Application Pub. No. 2014/0087977, which is incorporated herein by reference, discloses high water and brine swell elastomeric compositions comprising a high molecular weight super absorbent polymer such as poly(acrylamide-co-acrylic acid) potassium and a low molecular weight salt such as potassium acetate.

U.S. Patent Application Pub. No. 2015/0299438, which is incorporated herein by reference, discloses a water swellable rubber composition comprising a crosslinkable ethylene oxide based hydrophilic elastomer and a super absorbent polymer as a water swellable, non-elastomeric material.

U.S. Patent Application Publication No. 2009/0084550 and 2012/0208934, which are each incorporated herein by reference, disclose water swellable rubber compositions comprising a base rubber, carboxymethylcellulose, and an acrylate copolymer U.S. Patent Application Publication No. 2013/0269787 discloses a water swellable rubber composition comprising a super absorbent polymer, e.g., neutralized polyacrylic acid sodium salt, starch-polyacrylic acid salt, or crosslinked carboxymethyl cellulose.

Each of the references provided herein is incorporated herein by reference.

We claim:

1. A water-swellable elastomeric composition comprising
   (i) 100 pph of a base polymer comprising an acrylonitrile butadiene rubber (NBR);
   (ii) 10-100 pph of a fibrous non-starch plant-based polysaccharide selected from the group consisting of apple fiber, beet fiber, carrot fiber, coir fiber (coconut husk), flax fiber (herbaceous plant), grapefruit fiber, orange fiber, palm fiber, parsnip fiber, rice paper plant fiber (*Tetrapanax papyriferus*), squash fiber, turnip fiber, and yam fiber, and mixtures and blends thereof;
   (iii) 5-20 pph of a diffusion promoter;
   (iv) 5-20 pph of a fluid retaining agent; and
   (v) 5-50 pph of a silica reinforcing filler.

2. The water-swellable elastomeric composition of claim 1, wherein the acrylonitrile butadiene rubber (NBR) comprises acrylonitrile in the range of 19-51%.

3. The water-swellable elastomeric composition of claim 1, wherein the fibrous non-starch plant-based polysaccharide comprises carrot fiber.

4. The water-swellable elastomeric composition of claim 1, wherein the NBR comprises acrylonitrile in the range of 19-51% and the fibrous non-starch plant-based polysaccharide is carrot fiber.

5. The water-swellable elastomeric composition of claim 1, wherein the diffusion promoter is selected from the group consisting of sodium acetate, potassium acetate, sodium formate, potassium formate, sodium triphosphate, potassium triphosphate, sodium polyphosphate, potassium polyphosphate, sodium carbonate, potassium carbonate, or mixtures and combinations thereof.

6. The water-swellable elastomeric composition of claim 3, wherein the fluid retaining agent is selected from the group consisting of kaolinite, illite, chlorite, bentonite, calcium bentonite and sodium bentonite.

7. The water-swellable elastomeric composition of claim 3, further comprising an additive selected from the group consisting of curing agents, activators, plasticizers, retarders, scavengers, accelerators, antioxidants, colorants, anti ozonants, processing aids, biocides, flame retardants; or blends or mixtures thereof.

8. The water-swellable elastomeric composition of claim 1, comprising a plasticizer at 2.5-25 pph, an activator at 2.5-10 pph, an antioxidant at 0.5-2 pph, and a curing agent at 0.5-3 pph.

9. The water-swellable elastomeric composition of claim 1, wherein the diffusion promoter comprises an organic diffusion promoter and an inorganic diffusion promoter.

10. The water-swellable elastomeric composition of claim 2, wherein the acrylonitrile butadiene rubber (NBR) comprises acrylonitrile in the range of 26-49%, or 20-33%.

11. The water-swellable elastomeric composition of claim 3, comprising the fibrous non-starch plant-based polysaccharide in a range of 20-80 pph, 30-70 pph, or 40-60 pph.

12. A water-swellable elastomeric composition comprising
    (i) 100 pph of a base polymer comprising an acrylonitrile butadiene rubber (NBR);
    (ii) 10-100 pph of a fibrous non-starch plant-based polysaccharide comprising carrot fiber;
    (iii) 5-20 pph of a diffusion promoter;
    (iv) 5-20 pph of a fluid retaining agent; and
    (v) 5-50 pph of a silica reinforcing filler.

13. The water-swellable elastomeric composition of claim 12, wherein the NBR comprises acrylonitrile in the range of 19-51%.

14. The water-swellable elastomeric composition of claim 13, wherein the diffusion promoter is selected from the group consisting of sodium acetate, potassium acetate, sodium formate, potassium formate, sodium triphosphate, potassium triphosphate, sodium polyphosphate, potassium polyphosphate, sodium carbonate, potassium carbonate, and combinations thereof.

15. The water-swellable elastomeric composition of claim 14, wherein the fluid retaining agent is selected from the group consisting of kaolinite, illite, chlorite, bentonite, calcium bentonite, and sodium bentonite.

16. The water-swellable elastomeric composition of claim 12, further comprising an additive selected from the group consisting of curing agents, activators, plasticizers, retarders, scavengers, accelerators, antioxidants, colorants, antiozonants, processing aids, biocides, flame retardants; or blends or mixtures thereof.

* * * * *